US011955050B2

(12) United States Patent
Yin et al.

(10) Patent No.: US 11,955,050 B2
(45) Date of Patent: Apr. 9, 2024

(54) TRANSISTOR STRUCTURE, GATE DRIVING CIRCUIT, DRIVING METHOD THEREOF, AND DISPLAY PANEL

(71) Applicant: HKC CORPORATION LIMITED, Shenzhen (CN)

(72) Inventors: Dujuan Yin, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/147,702

(22) Filed: Dec. 28, 2022

(65) Prior Publication Data

US 2024/0005839 A1 Jan. 4, 2024

(30) Foreign Application Priority Data

Jun. 30, 2022 (CN) ......................... 202210760342.8

(51) Int. Cl.
*H01L 21/8234* (2006.01)
*G09G 3/20* (2006.01)

(52) U.S. Cl.
CPC ... *G09G 3/2092* (2013.01); *G09G 2310/0267* (2013.01); *G09G 2320/041* (2013.01)

(58) Field of Classification Search
CPC .......... G09G 3/2092; G09G 2310/0267; H01L 21/823418; H01L 29/41725; H01L 29/41733; H01L 29/66575
See application file for complete search history.

(56) References Cited

U.S. PATENT DOCUMENTS

2019/0221518 A1* 7/2019 Verma ................ H01L 29/0696

* cited by examiner

*Primary Examiner* — Dennis P Joseph
(74) *Attorney, Agent, or Firm* — Hodgson Russ LLP

(57) ABSTRACT

The transistor structure includes a transistor and a plurality of gate lines electrically connected to the transistor, wherein the transistor includes a semiconductor layer and a source and a drain that are disposed on the semiconductor layer, the source is connected to a source region of the semiconductor layer, and the drain is connected to a drain region of the semiconductor layer; and the transistor further includes a plurality of gates disposed corresponding to a channel region of the semiconductor layer, wherein the plurality of gates are spaced in a length direction of the source and the drain, and the plurality of gates are connected to the plurality of gate lines in a one-to-one correspondence. The technical solution of the present application can compensate and adjust the transistor after a working environment temperature changes, to avoid abnormal display.

12 Claims, 8 Drawing Sheets

TRANSISTOR STRUCTURE, GATE DRIVING CIRCUIT, DRIVING METHOD THEREOF, AND DISPLAY PANEL

CROSS-REFERENCE TO RELATED APPLICATION

This application claims priority to Chinese Patent Application No. 202210760342.8, filed Jun. 30, 2022, the entire disclosure of which is incorporated herein by reference.

FIELD OF TECHNOLOGY

The present application relates to the field of display driving technologies, and in particular, to a transistor structure, a gate driving circuit, a driving method thereof, and a display panel.

BACKGROUND

In the display field, display products usually face a working environment with a relatively wide temperature change range. In particular, when the temperature of the working environment changes, a voltage threshold of a transistor often drifts. Moreover, the drift of the voltage threshold easily causes abnormal display.

SUMMARY

There are provided a transistor structure, a gate driving circuit, a driving method thereof, and a display panel according to embodiments of the present disclosure. The technical solution is as below.

According to a first aspect of the present disclosure, there is provided a transistor structure, including a transistor and a plurality of gate lines electrically connected to the transistor, wherein the transistor includes a semiconductor layer and a source and a drain that are disposed on the semiconductor layer, the source is connected to a source region of the semiconductor layer, and the drain is connected to a drain region of the semiconductor layer; and the transistor further includes a plurality of gates disposed corresponding to a channel region of the semiconductor layer, wherein the plurality of gates are spaced in a length direction of the source and the drain, and the plurality of gates are connected to the plurality of gate lines in a one-to-one correspondence.

According to a second aspect of the present disclosure, there is provided a driving method of a gate driving circuit, wherein the gate driving circuit includes at least one transistor structure described above, and the driving method of a gate driving circuit includes:

detecting an environment temperature of the gate driving circuit;

determining a predetermined starting quantity of gates based on the environment temperature; and inputting gate signals to the predetermined starting quantity of gates by using a predetermined starting quantity of gate lines, and controlling on or off of the transistor structure.

According to a third aspect of the present disclosure, there is provided a display panel, including a display region and a non-display region, wherein the display panel further includes a gate driving circuit, the gate driving circuit includes the transistor structure described above, and the gate driving circuit is disposed in the non-display region; and the display panel further includes a temperature detector and a controller, wherein the controller is connected to the gate lines, the controller is further connected to the temperature detector, the temperature detector is configured to detect an environment temperature of the gate driving circuit, and the controller controls a starting quantity of gates based on the environment temperature.

It should be understood that the above general description and the following detailed description are only exemplary, and should not be construed as a limitation to the present application.

BRIEF DESCRIPTION OF THE DRAWINGS

The above and other objectives, features, and advantages of the present application will become more apparent by describing exemplary embodiments thereof in detail with reference to the accompanying drawings.

DETAILED DESCRIPTION OF THE EMBODIMENTS

Figure 1:
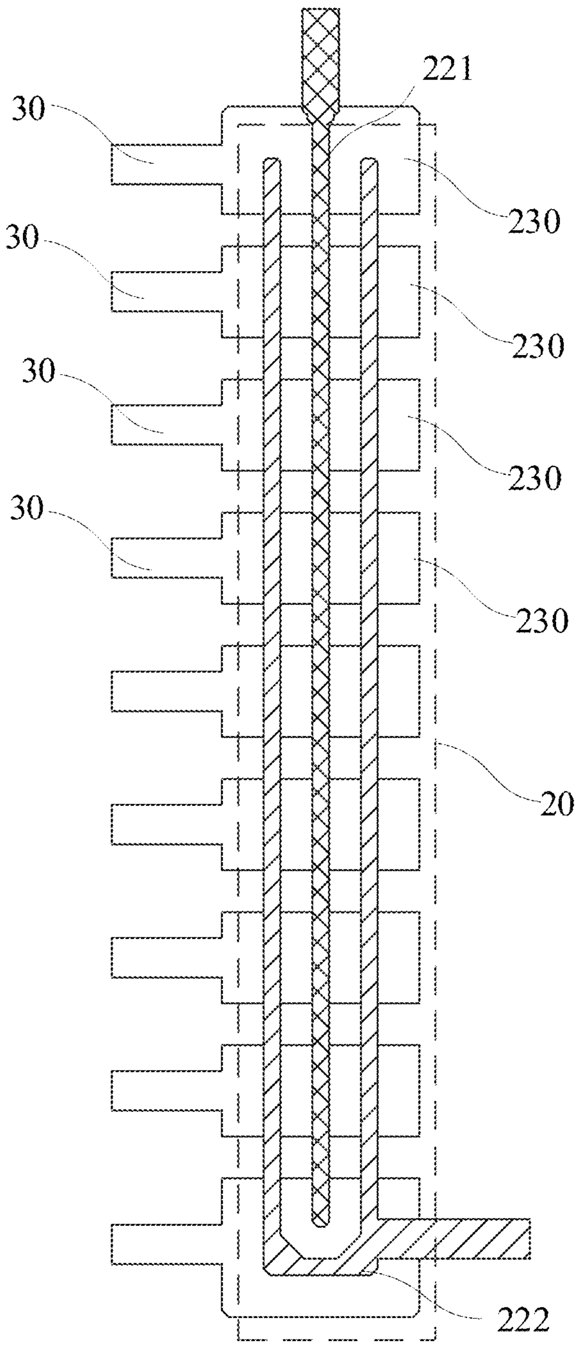
FIG. 1 is a schematic structural diagram of a transistor according to a first embodiment of the present application.

Although the present application can readily be embodied in different forms of implementations, however, only some of the specific implementations are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each implementation of the present application must possess the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the implementations illustrated in the drawings, indications of direction (such as up, down, left, right, front and back) are used to explain that the structure and movement of the various elements of the present application are not absolute but relative. These descriptions are appropriate when these elements are in the positions shown in the drawings. If the description of the positions of the element changes, the indications of the directions change accordingly.

The exemplary implementations are described more comprehensively below with reference to the accompanying drawings. However, the exemplary implementations can be implemented in a variety of forms and should not be construed as being limited to the examples set forth herein. Rather, these exemplary implementations are provided so that the description of the present application will be more comprehensive and complete, and the concept of exemplary implementations will be fully connected to those skilled in the art. The accompanying drawings are only schematic illustrations of the present application and are not necessarily drawn to scale. Like reference signs in the drawings denote identical or similar parts and thus repetitive descriptions thereof will be omitted.

The preferred implementations of the present application are further elaborated below in conjunction with the accompanying drawings of the description.

Embodiment 1

Figure 2:
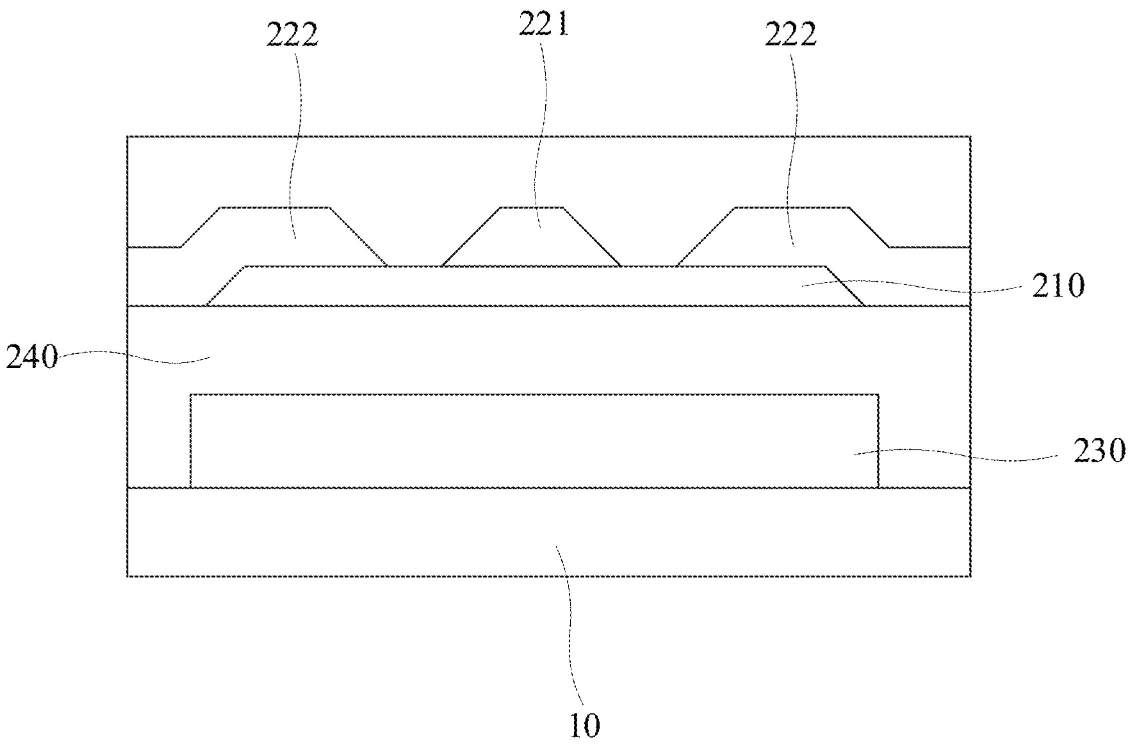
FIG. 2 is a schematic structural diagram of a cross section of the transistor in FIG. 1 in the present application.

As shown in FIG. 1 and FIG. 2, the present application provides a transistor structure, including a transistor and a plurality of gate lines electrically connected to the transistor, wherein the transistor includes a thin film transistor (TFT) switch. The TFT switch has the advantages of high responsiveness, high brightness, and high contrast. Generally, the transistor is disposed on a substrate 10, and the substrate 10 may be understood as a transparent material, for example, silicon dioxide.

The transistor 20 includes a semiconductor layer 210 and a source 221 and a drain 222 that are disposed on the semiconductor layer 210. The source 221 is connected to a source region of the semiconductor layer 210, and the drain 222 is connected to a drain region of the semiconductor layer 210. The semiconductor layer 210 is an active layer of the transistor. The semiconductor layer 210 includes at least one metal oxide layer, for example, an indium gallium zinc oxide (IGZO) layer. The IGZO is amorphous oxide containing indium, gallium, and zinc with carrier mobility being 20 to 30 times that of amorphous silicon, which can greatly improve a charge and discharge rate of the TFT switch to an electrode, improve a response speed, and implement a faster refresh rate. In addition, the faster response also greatly improves a line scanning rate of pixels.

The source 221 and the drain 222 are disposed on the semiconductor layer 210 at intervals, the source 221 is connected to the source region of the semiconductor layer 210, and the drain 222 is connected to the drain region of the semiconductor layer 210.

The transistor 20 further includes a plurality of gates 230 corresponding to a channel region 211 of the semiconductor layer 210, and the plurality of gates 230 are disposed in a length direction of the source 221 and the drain 222 at intervals; and the plurality of gates 230 are connected to the plurality of gate lines 30 in a one-to-one correspondence. That is, a gate 230 of each transistor 20 is connected to a control line, and the control line is the gate line 30. The gate line 30 is configured to connect a processor, and the processor controls on or off of the transistor 20 through the gate line 30. The plurality of gates 230 are disposed in the length direction of the source 221 and the drain 222 at intervals, and orthographic projections of the gates 230 on the substrate 10 cover an orthographic projection of the channel region 211 of the semiconductor layer 210 on the substrate 10, to ensure that a magnetic field formed by the gates 230 can cover the channel region 211 of the semiconductor layer 210. Generally, to improve the driving accuracy, the gates 230 cover the area of the semiconductor layer 210, and the area covered by the gates 230 may also be greater than the orthographic projection of the channel region 211 of the semiconductor layer 210 on the substrate 10. The gate 230 is configured to control on of the drain 222 and the source 221. When the gate 230 is powered on, a magnetic field is generated, and the magnetic field acts on the semiconductor layer 210, to turn on the drain 222 and the source 221.

The plurality of gate lines 30 include a main control gate line 331 and at least one compensation gate line 332, wherein a starting quantity of the at least one compensation gate line 332 is determined based on an environment temperature. When the environment temperature is relatively high, only the main control gate line 331 may be started, and when the environment temperature is relatively low, a specific quantity of compensation gate lines 332 are started. By starting the compensation gate line 332, a width-to-length ratio of the transistor 20 is compensated, to increase the width-to-length ratio of the transistor 20. That is, in this embodiment, the width-to-length ratio of the transistor 20 may be adjusted according to a requirement of the environment temperature.

It should be noted that in this field, a width of a channel of the transistor 20 is greater than a length of the channel of the transistor, and generally a ratio of the width to the length of the channel is greater than 1.

In the technical solution of this embodiment, the transistor structure provided in the present application can adjust the width-to-length ratio of the transistor structure, so that the electrical performance of the transistor structure can be effectively compensated and adjusted, to avoid abnormal display.

Specifically, the semiconductor layer 210 is disposed between the source 221 and the drain 222, and the channel region 211 is formed in the semiconductor layer 210. The length direction of the source 221 in the channel region 211 is the width of the channel region 211, and a distance between the source 221 and the drain 222 in the channel region 211 is the length of the channel region 211. When the gate is powered on, a magnetic field is generated, and the magnetic field acts on the semiconductor layer 210, to turn on the semiconductor layer 210 on which the magnetic field acts. When the gate is powered, a current flows through the channel region 211 corresponding to the main control gate line 331. Based on a change of the environment temperature, the compensation gate line 332 may be turned on or off. In this way, a path in which the current flows through the channel region 211 corresponding to the compensation gate line 332 also changes. That is, under the impact of on or off of the compensation gate line 332, the length of the current flowing through the channel region 211 changes. It can be learned that in this implementation solution, the width-to-length ratio of the transistor 20 can be controlled through the starting quantity of compensation gate lines 332. Then, after the working environment temperature changes, the transistor 20 is compensated and adjusted, to avoid abnormal display.

Figure 3:
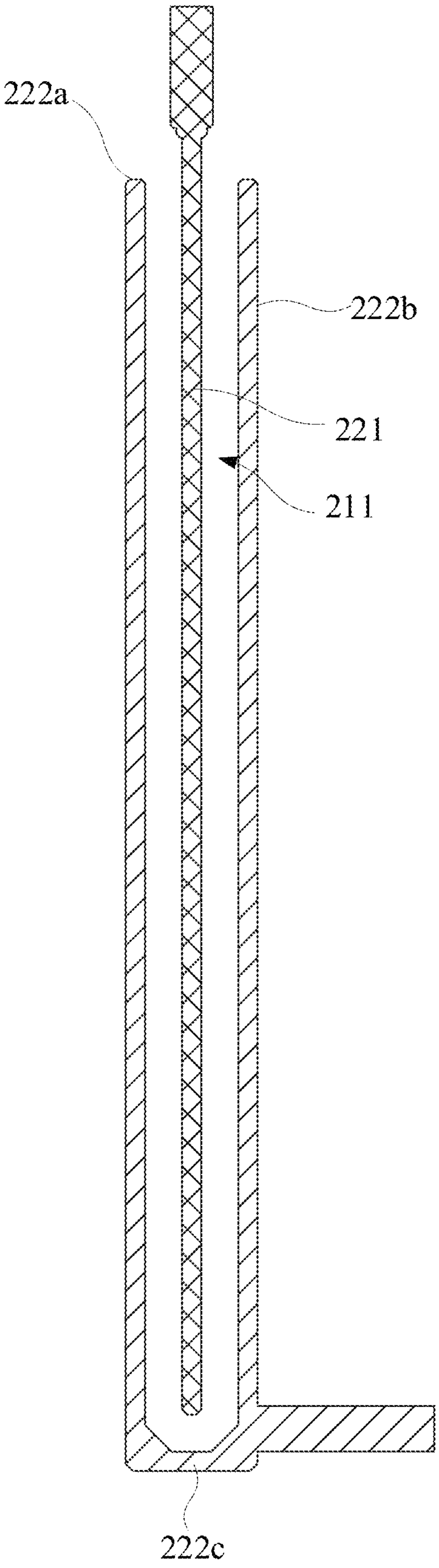
FIG. 3 is a schematic structural diagram of a source and a drain in FIG. 1 in the present application.

As shown in FIG. 3, to further improve the width-to-length ratio of the transistor 20, the drain 222 includes a first line segment 222*a*, a second line segment 222*b*, and a connection line segment 222*c*, wherein the first line segment 222*a*, the connection line segment 222*c*, and the second line segment 222*b* are sequentially connected to form a U-shaped line. The source 221 is disposed between the first line segment 222*a* and the second line segment 222*b*, and the semiconductor layer 210 is located between the source 221 and the U-shaped line. A U-shaped drain region matching the drain 222 and a linear source region matching the source 221 are similarly formed in a path formed by the semiconductor layer 210. A distance between the drain 222 and the source 221 is fixed. That is, the length of the channel is fixed. The semiconductor layer 210 is set into a U-shaped line, to increase a path in which the semiconductor layer 210 passes through compared with a case that a single side of the semiconductor layer 210 is set in the length direction of the source 221. The width of the channel region 211 is doubled. A distance between the first line segment 222*a* and the source 221 is constant, that is, the length of the channel region 211 is constant. Therefore, only the width of the channel region 211 is increased, to increase the width-to-length ratio of the channel region 211 of the transistor 20.

During manufacturing of the transistor, all the source 221, the drain 222, and the semiconductor layer 210 are straight lines. When the transistor 20 is set, the path that the source 221, the drain 222, and the semiconductor layer 210 pass through together is divided into a plurality of control regions, and each control region is provided with a gate 230, to form the transistor 20.

Figure 4:
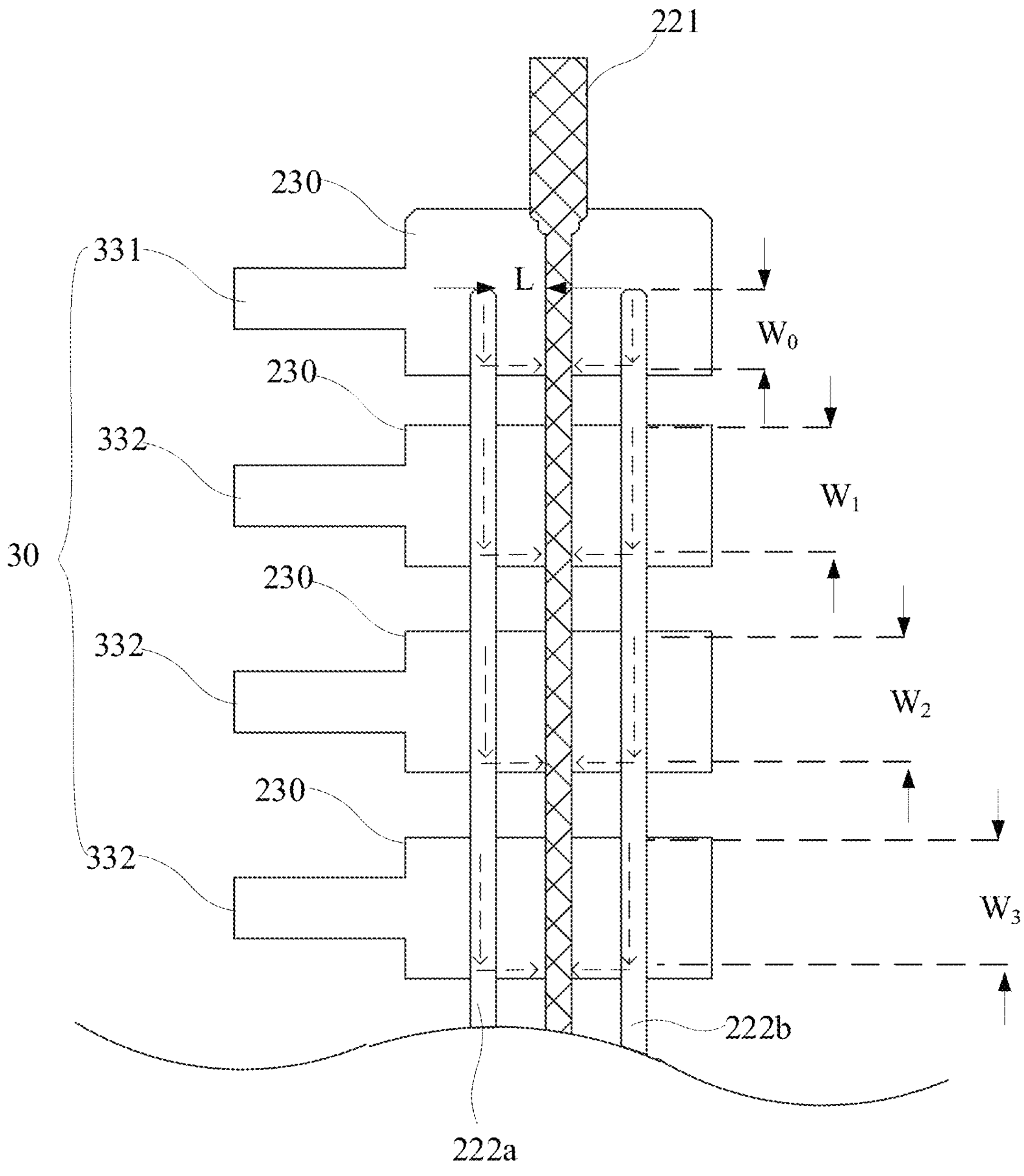
FIG. 4 is a schematic diagram of a current flowing path in FIG. 1 in the present application.

It should be noted that in this embodiment, increasing the width-to-length ratio of the transistor 20 is to increase an effective width-to-length ratio, that is, increase the width of the channel through which the current flows. As shown in FIG. 4, a dashed arrow is a flowing path of a current. It can be learned that when the main control gate line 331 is powered, a current flows through a semiconductor path corresponding to the main control gate line 331. In this case, the width-to-length ratio of the transistor 20 is $W_0/L$. Three compensation gate lines 332 are powered on sequentially, and in a case that the adjacent first compensation gate line 332 is powered on, the width-to-length ratio is increased to $W_1/L$. In this case, a total effective width-to-length ratio of the transistor 20 is $W_0/L+W_1/L$. In a case that the second compensation gate line 332 is powered on, the width-to-length ratio is increased to $W_2/L$. In this case, the total effective width-to-length ratio of the transistor 20 is $W_0/L+W_1/L+W_2/L$. In a case that the third compensation gate line 332 is powered on, the width-to-length ratio is increased to $W_3/L$. In this case, the total effective width-to-length ratio of the transistor 20 is $W_0/L+W_1/L+W_2/L+W_3/L$. In this way, the effective width-to-length ratio W/L of the transistor 20 increases as the started compensation gate line 332 increases.

To reduce abnormal signals and facilitate processing, a length of the first line segment 222*a* is equal to a length of the second line segment 222*b*, and a distance between the source 221 and the first line segment 222*a* is equal to a distance between the source and the second line segment 222*b*. In this way, a distance between a left side of the source 221 and the drain 222 is equal to a distance between a right side of the source and the drain. Compared with setting of a single first line segment 222*a* and a single source 221, the setting of the second line segment 222*b* and the source 221 is increased, to increase at least twice of the width of the channel region 211. In addition, it is also ensured that the length of the channel region 211 is consistent before and after the path is extended.

In some high-resolution refresh displays, a relatively large driving current is usually required. Therefore, a plurality of transistors 20 are set. The plurality of transistors 20 are sequentially arranged in a length direction perpendicular to the source 221. Each drain 222 forms a U-shaped line, and the source 221 is disposed in the U-shaped line. The sources 221 and the drains 222 may share one input line and one output line. By setting the plurality of transistors 20, a current flowing in the input line may be increased, so that for the high-resolution refresh displays, in this embodiment, a relatively large driving current can be provided to meet a use requirement.

Figure 5:
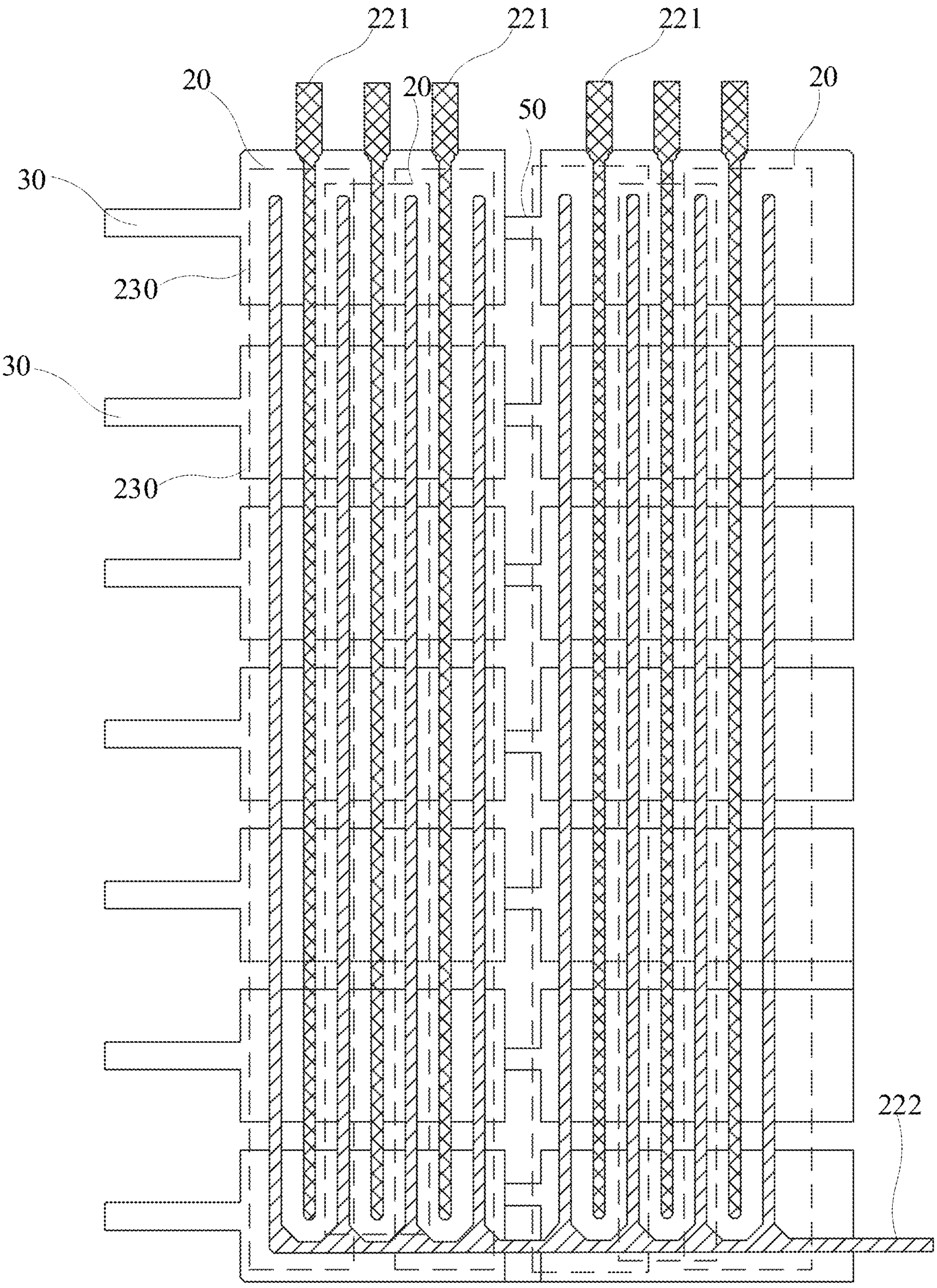
FIG. 5 is a schematic structural diagram in which a plurality of transistors are distributed in a length direction perpendicular to a source in FIG. 1 in the present application.

Referring to FIG. 5, to fully use a setting space of the transistor structure, in two adjacent transistors 20, the first line segment 222*a* and the second line segment 222*b* that are close are the same line segment. It also may be understood that the first line segment 222*a* and the second line segment 222*b* of the two adjacent transistors 20 coincide. Therefore, in a case that two transistors 20 are set adjacent to each other, when a second line segment 222*b* of one transistor 20 transmits a current, the other adjacent transistor 20 also works, and a second line segment 222*b* of a previous transistor 20 may be used for transmitting a current. In this way, an arrangement position of at least one line segment may be saved. By analogy, when the plurality of transistors 20 are set, more transistors 20 may be arranged by saving a space, or an entire area of the gate driving circuit is reduced, to implement a narrow side frame.

In addition, during work, the transistor structure generates relatively large heat. To reduce the impact of the heat on the structure, a heat dissipation effect of the structure is improved. There are at least two adjacent transistors 20 perpendicular to the length direction of the source 221, and the two adjacent transistors 20 are distributed at intervals. The transistor structure further includes a plurality of interval gate lines 50, wherein the interval gate line 50 is disposed between the transistors 20 distributed at intervals, and the interval gate line 50 connects gates 230 of adjacent transistors 20. The transistors 20 are spaced apart by a specific distance, to avoid heat accumulation caused by dense arrangement. The interval gate line 50 is connected to each transistor 20. In addition, to ensure that the transistors 20 distributed on a path direction perpendicular to the source 221 are uniformly controlled, all the interval gate lines 50 are connected to the corresponding main control gate line 331 and compensation gate lines 332.

Therefore, the main control gate line 331 is started, and through setting of the interval gate lines 50, all the transistors 20 in the path direction perpendicular to the source 221 are started. Similarly, the compensation gate lines 332 are started, and through setting of the interval gate lines 50, all the transistors 20 in the path direction perpendicular to the source 221 are also started.

It should be noted that the plurality of transistors 20 may be arranged close to each other. The plurality of transistors 20 form a group, and there may be a plurality of groups, for example, three transistors 20 form a group, and an interval gate line 50 is disposed between each group.

In addition, the interval gate line 50 may further be independently connected to a control end, to independently control each group of transistors 20.

There are at least two wiring manners of the transistor 20.

The first wiring manner is a bottom gate. The gate 230 is disposed on one side of the semiconductor layer 210 close to the substrate 10, and an insulating layer 240 is disposed between the gate and the semiconductor layer 210. The source 221 is in direct contact with the source region of the semiconductor layer 210, and the drain 222 is in direct contact with the drain region of the semiconductor layer 210. In such a setting manner, the gate 230 is first disposed on the substrate 10, that is, the gate 230 is disposed on a bottom layer. The insulating layer 240 is disposed on the gate 230, and a material of the insulating layer 240 is generally silicon dioxide. The semiconductor layer 210 is disposed on the insulating layer 240, that is, the semiconductor layer 210 is formed on the insulating layer 240. The source 221 and the drain 222 are disposed on the semiconductor layer 210. Therefore, the first type of structure setting of the transistor 20 is completed. In this manner, the gate 230 may block light emitted to the semiconductor layer 210, to reduce the impact of the light on the semiconductor layer 210.

The second wiring manner is a top gate, and the semiconductor layer 210 is disposed on the substrate 10. The transistor further includes an insulating layer 240, wherein the insulating layer 240 is disposed between the gate 230 and the semiconductor layer 210, the source 221 and the drain 222 are respectively provided with extending lines, and the extending lines pass through the insulating layer 240 and are connected to the semiconductor layer 210. In such a setting manner, the semiconductor layer 210 is first disposed on the substrate 10, the insulating layer 240 is disposed on the semiconductor layer 210, and the gate 230 is disposed on the insulating layer 240, that is, the gate is disposed on the insulating layer 240. The source 221 and the drain 222 are disposed on the gate 230, and the gate 230 is insulated from the source 221 and the drain 222. In addition, to ensure connection between the source 221 and the drain 222 and the semiconductor layer 210, two through holes are provided in the insulating layer 240, wherein one through hole corresponds to the source 221 and the semiconductor layer 210, and the other through hole corresponds to the drain 222 and the semiconductor layer 210. Extending lines are disposed in the through holes, wherein one extending line connects the source 221 and the semiconductor layer 210, and the other extending line connects the drain 222 and the semiconductor layer 210.

Embodiment 2

Figure 6:
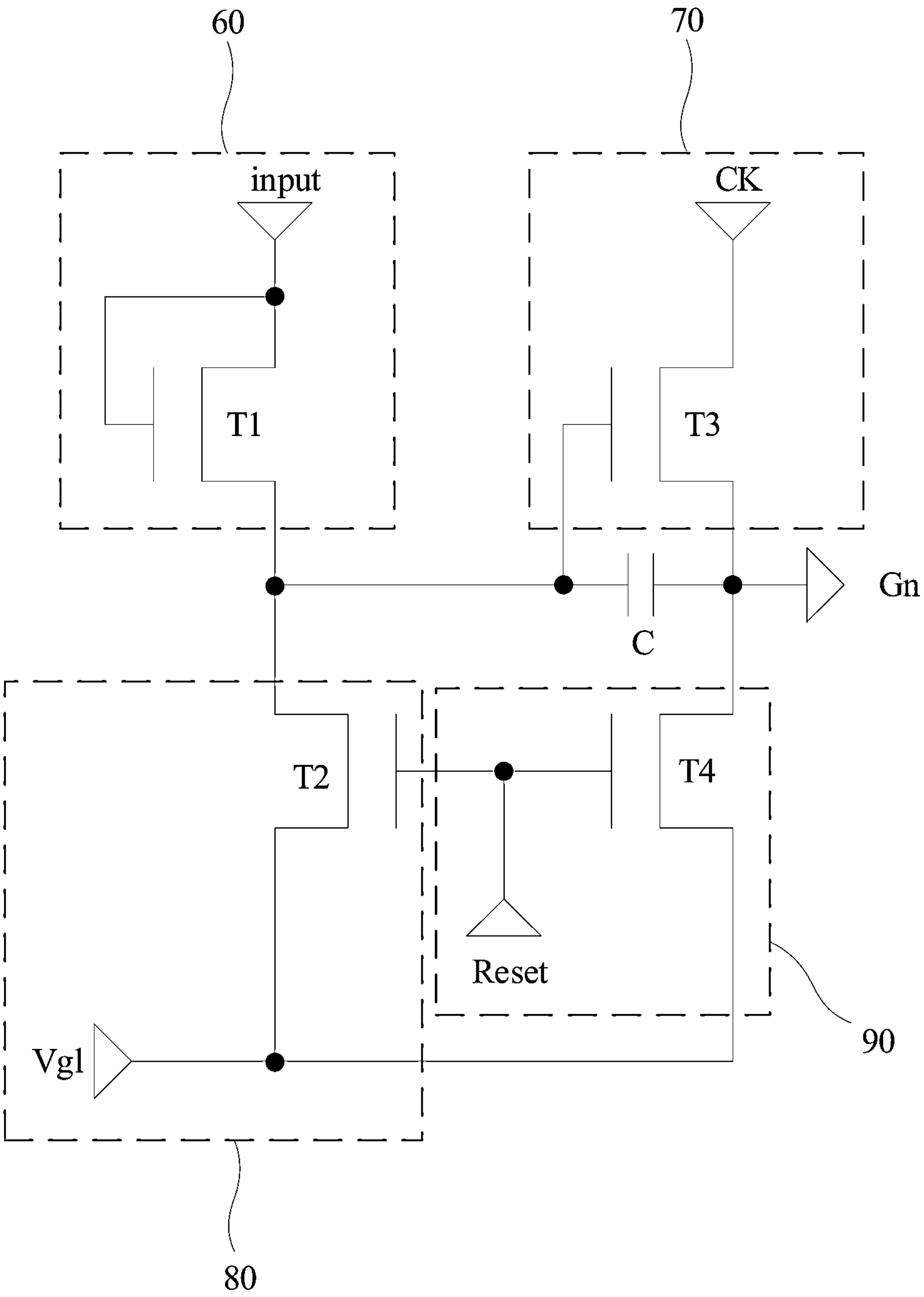
FIG. 6 is a schematic diagram of connection of a gate driving circuit according to a second embodiment of the present application.

Referring to FIG. 6, this embodiment further provides a gate driving circuit, including at least one transistor structure described above.

Specifically, the gate driving circuit includes a pull-up control module 60, a pull-up module 70, a pull-down control module 80, and a pull-down module 90. The pull-up control module 60 is configured to receive an input signal, the pull-up module 70 is configured to receive a clock signal, and the pull-up control module 60 and the pull-up module 70 include at least one transistor structure described above. The pull-up control module 60 includes a first transistor switch T1 and a signal input end Input; and the pull-up module 70 includes a third transistor switch T3 and a clock signal end CK. The pull-down control module 80 includes a second transistor switch T2 and a reset voltage end Vg1. The pull-down module 90 includes a fourth transistor switch T4 and a reset end Reset.

The transistor 20 in the gate driving circuit is generally a transistor 20 with a relatively large width-to-length ratio. In the gate driving circuit, transistors of the first transistor switch T1 and third transistor switch T3 have relatively large width-to-length ratios, for example, the width-to-length ratio is greater than 100. The first transistor switch T1 and the third transistor switch T3 are easily affected by a temperature, resulting in deviation of a threshold voltage. In this embodiment, the transistors mentioned above may be disposed for the first transistor switch T1 and the third transistor switch T3. The width-to-length ratio of the transistor can be adjusted.

The signal input end Input inputs a high level, the first transistor switch T1 is turned on, a capacitor C is charged, and the third transistor switch T3 is turned on under the action of the high level. The clock signal is loaded on the capacitor C, and a control signal is outputted through an output end Gn. After the control signal is outputted, the reset end Reset outputs the high level, the second transistor switch T2 and the fourth transistor switch T4 are turned on, and voltages at two ends of the capacitor C are reset to voltages at the reset voltage end Vg1.

Embodiment 3

Figure 7:
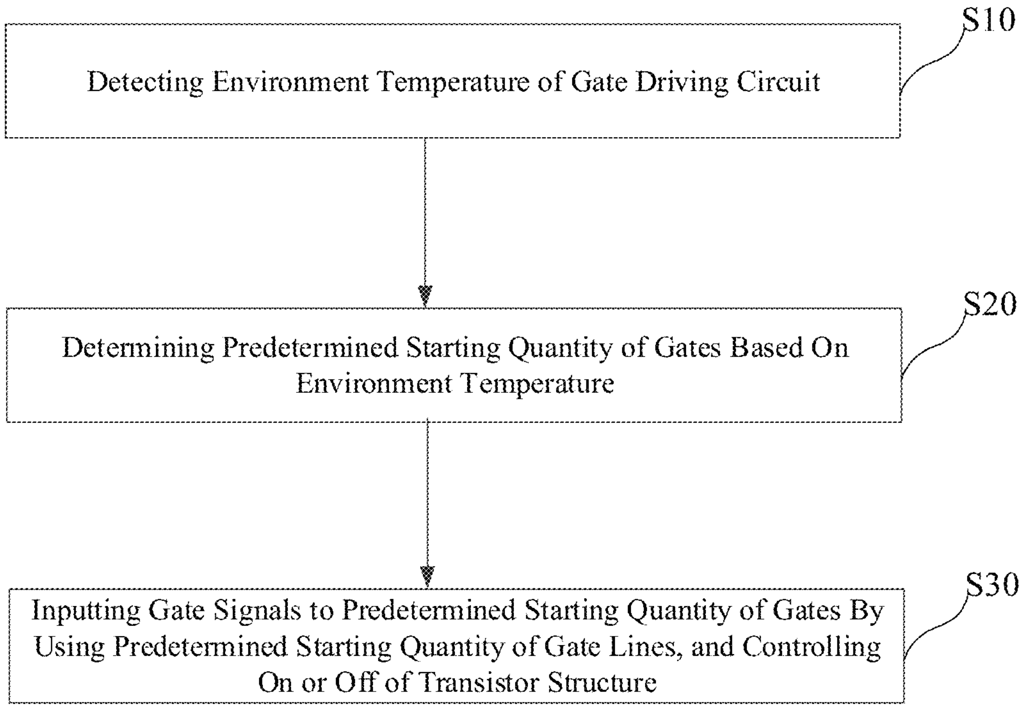
FIG. 7 is a step flowchart of a driving method of a gate circuit according to a third embodiment of the present application.

Referring to FIG. 7, the present application further provides a driving method of a gate driving circuit. The driving method of a gate driving circuit is applicable to the transistor structure described above, and the driving method of a gate driving circuit includes:

Step S10: detecting an environment temperature of a gate driving circuit. The gate driving circuit may be connected to a temperature detector, and an environment temperature of the gate driving circuit is detected by using the temperature detector and the detected environment temperature is fed back to a processor.

Step S20: determining a predetermined starting quantity of gates based on the environment temperature. The processor predetermines a starting quantity of gates according to the environment temperature.

Step S30: inputting gate signals to the predetermined starting quantity of gates by using a predetermined starting quantity of gate lines, and control on or off of the transistor structure. The width-to-length ratio of the transistor increases or decreases as the starting quantity increases or decreases.

Specifically, a main control signal is obtained, and the main control gate line 331 is started according to the main control signal; and the main control gate line 331 is connected to a power supply through the main control signal, to ensure that the source 221 and the drain 222 in the transistor 20 corresponding to the main control gate line 331 are continuously turned on. That is, the main control gate line 331 is often started, to ensure a basic signal transmission requirement.

The environment temperature of the gate driving circuit is detected, and a starting quantity of compensation gate lines 332 is determined based on the environment temperature. Therefore, the starting quantity of compensation gate lines 332 is determined according to the environment temperature. The gate driving circuit is relatively sensitive to the operating environment temperature, and a threshold voltage of the TFT often drifts. A driving ability is insufficient in a low temperature. By starting the compensation gate line 332, more transistors 20 can be controlled to turn on, to improve the width-to-length ratios of the transistors, thereby improving the driving ability in the low temperature.

Heating occurs in a high temperature, and the compensation gate line 332 is closed, to reduce the width-to-length ratio of the transistor. Therefore, the heating of the TFT switch is reduced, and the abnormal display of the TFT switch caused by the drift of threshold voltage can be improved.

Further, the predetermined starting quantity of gate lines is negatively correlated with the environment temperature. It can be understood that a higher environment temperature indicates that the starting of the compensation gate line 332 is reduced, and a lower environment temperature indicates that the starting of the compensation gate line 332 is increased.

For example, three compensation gate lines 332 are respectively a first compensation line, a second compensation line, and a third compensation line.

An environment temperature of the transistor is detected, and a compensation signal is generated according to the environment temperature; and when the environment temperature is a first preset temperature, a first compensation signal is outputted to the first compensation line, and the source 221 and the drain 222 corresponding to the first compensation line are turned on.

When the environment temperature is a second preset temperature, the first compensation signal is outputted to the first compensation line, a second compensation signal is outputted to the second compensation line, and the source 221 and the drain 222 corresponding to the first compensation line and the source 221 and the drain 222 corresponding to the second compensation line are all turned on, to increase the width-to-length ratio of the transistor.

When the environment temperature is a third preset temperature, the first compensation signal is outputted to the first compensation line, the second compensation signal is outputted to the second compensation line, a third compensation signal is outputted to the third compensation line, the path of the source 221 and the drain 222 corresponding to the first compensation line, the path of the source 221 and the drain 222 corresponding to the second compensation line, and the path of the source 221 and the drain 222 corresponding to the third compensation line are all turned on. The first preset temperature is greater than the second preset temperature, and the second preset temperature is greater than the third preset temperature. For example, the first preset temperature is greater than 40° C., the second preset temperature is between and 40° C., and the third preset temperature is less than 0° C. Therefore, the width-to-length ratio of the transistor is continuously increased, to improve a low temperature feature.

Embodiment 4

Figure 8:
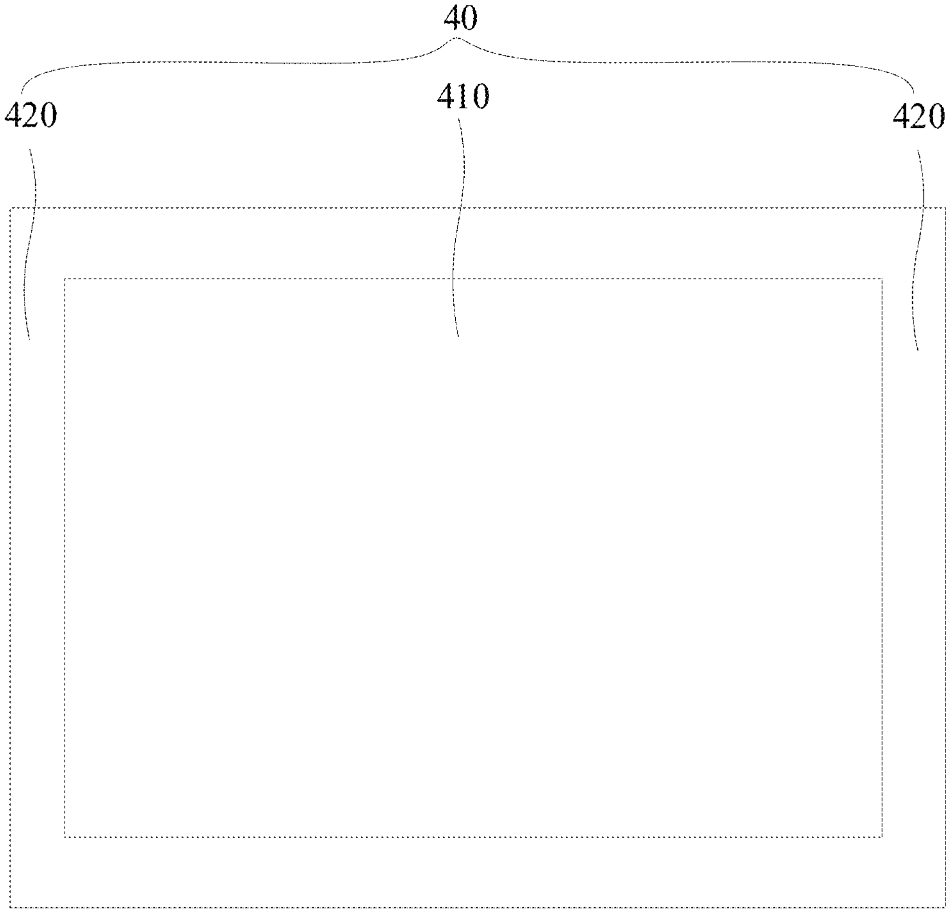
FIG. 8 is a schematic structural diagram of a display apparatus according to a fourth embodiment of the present application.

Referring to FIG. 8, the present application further provides a display panel 40, wherein the display panel 40 further includes a gate driving circuit, the gate driving circuit includes a transistor structure, and the gate driving circuit is disposed in a non-display region 420. The display panel 40 further includes a temperature detector and a controller, wherein the controller is connected to a gate line 30, the controller is further connected to the temperature detector, the temperature detector is configured to detect an environment temperature of the gate driving circuit, and the controller controls a starting quantity of gate lines 30 based on the environment temperature. A display region 410 is used for light transmission, and the non-display region 420 is generally disposed around the display region 410. The gate driving circuit is disposed in the non-display region 420, which can avoid blocking the light of the display region 410. In addition, an area of the non-display region 420 is reduced, and an area of the display region 410 may be improved.

In this embodiment, the temperature detector is configured to detect the environment temperature, and send the detected environment temperature to a processor, and the processor sends a voltage control signal to the gate line 30 according to the detected environment temperature.

This embodiment of the display panel of the present invention includes all the technical solutions of all the embodiments of the above transistors, and has the identical achieved technical effects. Details are not described herein again.

According to the transistor structure, the gate driving circuit, the driving method thereof, and the display panel provided in the present application, a width-to-length ratio of the transistor structure can be adjusted, so that the electrical performance of the transistor structure can be effectively compensated and adjusted, to avoid abnormal display.

While the present application has been described with reference to several exemplary implementations, it should be understood that the terms used herein are illustrative and exemplary and are not limiting. Since the present application can be embodied in various forms without departing from the spirit or essence of the invention, it should therefore be understood that the foregoing implementations are not limited to any of the foregoing details, but are to be interpreted broadly within the spirit and scope defined by the appended claims, so that all variations and modifications falling within the scope of the claims or their equivalents are to be covered by the appended claims.

What is claimed is:

1. A transistor structure, comprising:

a transistor and a plurality of gate lines electrically connected to the transistor, wherein the transistor comprises a semiconductor layer and a source and a drain that are disposed on the semiconductor layer, the source is connected to a source region of the semiconductor layer, and the drain is connected to a drain region of the semiconductor layer; and a plurality of gates disposed corresponding to a channel region of the semiconductor layer, wherein the plurality of gates are spaced in a length direction of the source and the drain, and the plurality of gates are connected to the plurality of gate lines in a one-to-one correspondence;

wherein the drain comprises a first line segment, a second line segment, and a connection line segment, the first line segment, the connection line segment, and the second line segment are sequentially connected to form a U-shaped line, and the source is disposed between the first line segment and the second line segment at intervals;

wherein a length of the first line segment is equal to a length of the second line segment, and a distance between the source and the first line segment is equal to a distance between the source and the second line segment.

2. The transistor structure according to claim 1, wherein a plurality of transistors are sequentially arranged in a length direction perpendicular to the source.

3. The transistor structure according to claim 2, wherein a first line segment of a drain of one of two adjacent transistors and a second line segment of a drain of another of the two adjacent transistors are a same line segment.

4. The transistor structure according to claim 1, wherein there are at least two adjacent transistors in a length direction perpendicular to the source, and the two adjacent transistors are distributed at intervals; and the transistor structure further comprises a plurality of interval gate lines, wherein the interval gate line is disposed between the transistors distributed at intervals, and the interval gate line connects gates of the adjacent transistors.

5. The transistor structure according to claim 1, wherein the semiconductor layer comprises at least one metal oxide layer.

6. A gate driving circuit comprising a pull-up control module, a pull-up module, a pull-down control module, and a pull-down module, wherein the pull-up control module is configured to receive an input signal, the pull-up module is configured to receive a clock signal, and the pull-up control module and the pull-up module comprise at least one transistor structure, comprising a transistor and a plurality of gate lines electrically connected to the transistor, wherein the transistor comprises a semiconductor layer and a source and a drain that are disposed on the semiconductor layer, the source is connected to a source region of the semiconductor layer, and the drain is connected to a drain region of the semiconductor layer;

wherein the transistor further comprises a plurality of gates disposed corresponding to a channel region of the semiconductor layer, wherein the plurality of gates are spaced in a length direction of the source and the drain, and the plurality of gates are connected to the plurality of gate lines in a one-to-one correspondence;

wherein the drain comprises a first line segment, a second line segment, and a connection line segment, the first line segment, the connection line segment, and the second line segment are sequentially connected to form a U-shaped line, and the source is disposed between the first line segment and the second line segment at intervals;

wherein a length of the first line segment is equal to a length of the second line segment, and a distance between the source and the first line segment is equal to a distance between the source and the second line segment.

7. The gate driving circuit according to claim 6, wherein a plurality of transistors are sequentially arranged in a length direction perpendicular to the source.

8. The gate driving circuit according to claim 7, wherein a first line segment of a drain of one of two adjacent transistors and a second line segment of a drain of another of the two adjacent transistors are a same line segment.

9. The gate driving circuit according to claim 6, wherein there are at least two adjacent transistors in a length direction perpendicular to the source, and the two adjacent transistors are distributed at intervals; and the transistor structure further comprises a plurality of interval gate lines, wherein the interval gate line is disposed between the transistors distributed at intervals, and the interval gate line connects gates of the adjacent transistors.

10. The gate driving circuit according to claim 6, wherein the semiconductor layer comprises at least one metal oxide layer.

11. A driving method of a gate driving circuit, the gate driving circuit including: a transistor and a plurality of gate lines electrically connected to the transistor, wherein the transistor comprises a semiconductor layer and a source and a drain that are disposed on the semiconductor layer, the source is connected to a source region of the semiconductor layer, and the drain is connected to a drain region of the semiconductor layer; and a plurality of gates disposed corresponding to a channel region of the semiconductor layer, wherein the plurality of gates are spaced in a length direction of the source and the drain, and the plurality of gates are connected to the plurality of gate lines in a one-to-one correspondence; wherein the drain comprises a first line segment, a second line segment, and a connection line segment, the first line segment, the connection line segment, and the second line segment are sequentially connected to form a U-shaped line, and the source is disposed between the first line segment and the second line segment at intervals; wherein a length of the first line segment is equal to a length of the second line segment, and a distance between the source and the first line segment is equal to a distance between the source and the second line segment;

wherein the driving method of the gate driving circuit comprises:

detecting an environment temperature of the gate driving circuit;

determining a predetermined starting quantity of gates based on the environment temperature; and inputting gate signals to the predetermined starting quantity of gates by using a predetermined starting quantity of gate lines, and controlling on or off of the transistor structure.

12. The driving method of a gate driving circuit according to claim 11, wherein the predetermined starting quantity of gate lines is negatively correlated with the environment temperature.

* * * * *